United States Patent
Danilov et al.

(10) Patent No.: US 10,191,678 B1
(45) Date of Patent: Jan. 29, 2019

(54) SYSTEM AND METHOD FOR DATA RE-PROTECTION WITH ERASURE CODING

(71) Applicant: EMC IP Holding Company LLC, Hopkinton, MA (US)

(72) Inventors: Mikhail Danilov, Saint Petersburg (RU); Konstantin Buinov, Kirovsk (RU); Andrey Fomin, Vsevolozhsk (RU); Sergey Koyushev, Saint Petersburg (RU); Maxim Trusov, Saint Petersburg (RU)

(73) Assignee: EMC IP Holding Company LLC, Hopkinton, MA (US)

( * ) Notice: Subject to any disclaimer, the term of this patent is extended or adjusted under 35 U.S.C. 154(b) by 98 days.

(21) Appl. No.: 15/499,445

(22) Filed: Apr. 27, 2017

(51) Int. Cl.
  *G06F 3/06* (2006.01)
  *G06F 12/02* (2006.01)

(52) U.S. Cl.
  CPC .......... *G06F 3/0619* (2013.01); *G06F 3/065* (2013.01); *G06F 3/067* (2013.01); *G06F 3/0638* (2013.01); *G06F 3/0652* (2013.01); *G06F 12/0253* (2013.01); *G06F 2212/40* (2013.01)

(58) Field of Classification Search
  CPC ........ G06F 3/0619; G06F 3/064; G06F 3/067; G06F 11/1092; G06F 2211/1028; G06F 2212/1032; G06F 11/008; G06F 11/1012; G06F 11/14; G06F 11/1096; H03M 13/616
  See application file for complete search history.

(56) References Cited

U.S. PATENT DOCUMENTS

| | | | | |
|---|---|---|---|---|
| 2007/0208748 A1* | 9/2007 | Li | ................. | G06F 17/30206 |
| 2011/0289351 A1* | 11/2011 | Rashmi | ............... | G06F 11/1662 |
| | | | | 714/6.32 |
| 2016/0011939 A1* | 1/2016 | Luby | .................. | G06F 11/1076 |
| | | | | 714/764 |

* cited by examiner

*Primary Examiner* — Reginald G Bragdon
*Assistant Examiner* — Thanh D Vo
(74) *Attorney, Agent, or Firm* — Womble Bond Dickinson (US) LLP

(57) ABSTRACT

The disclosure relates data protection management (e.g. data re-protection) for distributed storage systems. Specifically, the systems (and methods) of the disclosure implement erasure coding to protect replicated data efficiently while reducing the storage capacity overhead. Traditional approaches for data re-protection that implement erasure coding often require performing a complete re-encoding to reflect changes in data (e.g. a removal of data). The disclosure provides an improved mechanism for data re-protection by implementing an efficient re-encoding (or un-encoding) process that reduces the requirements for data reads and operations, and thus, reduces the resource requirements for data re-protection.

20 Claims, 9 Drawing Sheets

300 – MATRIX-BASED ERASURE CODING FOR AN EXAMPLE 12+4 CODING SCHEME

SYSTEM AND METHOD FOR DATA RE-PROTECTION WITH ERASURE CODING

TECHNICAL FIELD

Embodiments of the present disclosure relate generally to data storage systems. More particularly, embodiments of the disclosure relate to data protection management for distributed storage systems.

BACKGROUND

In data storage systems space is allocated for storing a primary set of user data. Additional storage space is allocated for providing data protection for the primary set of data. For example, data protection can include generating a backup copy of the primary data. The backup copy provides protection against data loss in the event of primary data failure (e.g. re-protection).

In geographically distributed data storage systems such as "cloud" storage systems, data protection can include replication to generate copies of primary and backup data and stored independently to provide additional protection. As distributed cloud storage systems grow in size, consisting of dozens (or hundreds) of zones and clusters, the need to recover from complex failures is critical because the statistical probability of a dual, triple and n zone failures increases as the number of zones increases within a single distributed storage system. Accordingly, there is a continued need to provide efficient mechanisms for large-scale data re-protection for distributed data storage systems.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Figure 1:
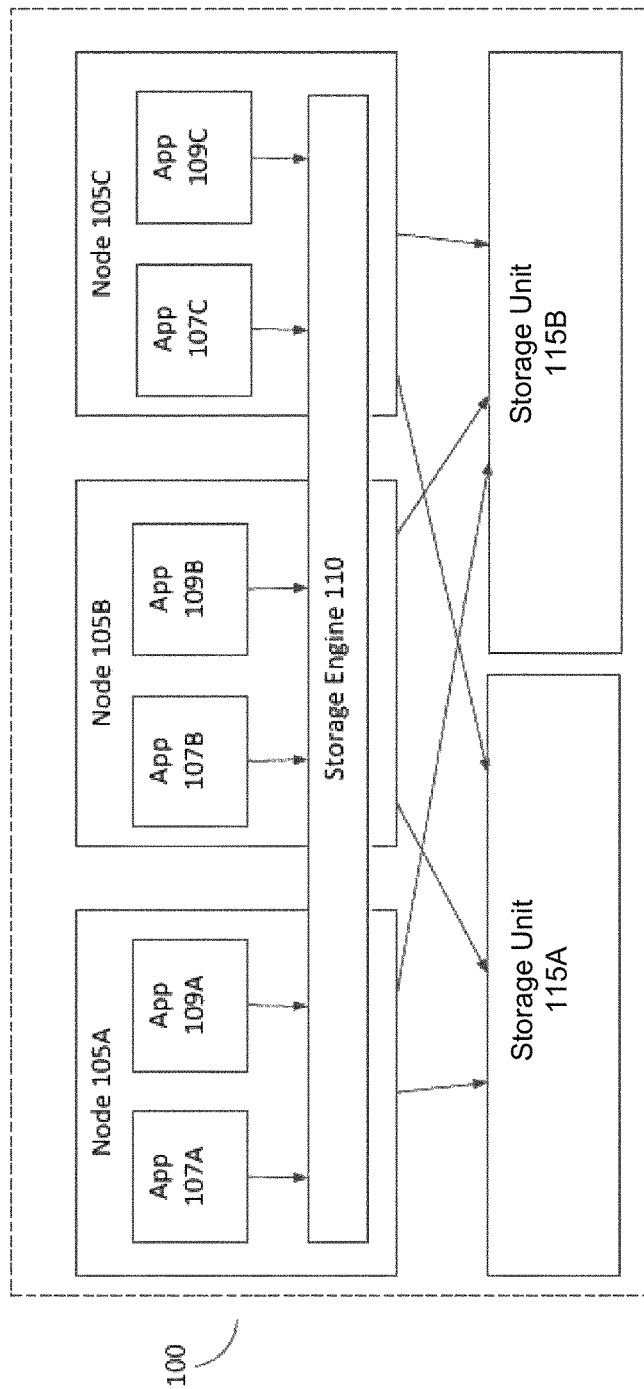
FIG. 1 is a block diagram illustrating an overview of an operating environment of a distributed data storage system according to one embodiment of the disclosure.

Various embodiments and aspects will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments.

Reference in the specification to "one embodiment" or "an embodiment" or "some embodiments" means that a particular feature, structure, or characteristic described in conjunction with the embodiment can be included in at least one embodiment. The appearances of the phrase "embodiment" in various places in the specification do not necessarily all refer to the same embodiment.

The disclosure relates to data protection management for distributed storage systems. Some distributed storage systems (e.g. the Dell EMC® Elastic Cloud Storage (ECSTM) solutions) employ data protection methodologies that minimize capacity overhead while providing robust data protection. For example, rather than relying on a conventional file system, some systems partition disk space into a set of blocks of fixed size called chunks to manage disk capacity. For example, these chunks may range in size from 64 MB to 128 MB (or more). In some implementations, all user data is stored in these chunks and the chunks are shared meaning that one chunk may (and, in most cases, does) contain fragments of several user objects. For example, chunk content may be modified in append-only mode, and when a chunk becomes full, the chunk is sealed (e.g. content of sealed chunks are immutable).

Storing user data in chunks allows the use of other techniques to minimize capacity overhead while providing robust data protection. In some implementations, systems may not necessarily employ traditional data protection schemes like mirroring or parity protection. Instead, to address the challenges of reducing the capacity overhead associated with data protection while improving the ability to recover from complex failures of storage infrastructure, some distributed data storage systems implement erasure coding.

As further described herein, embodiments of the systems in the present disclosure may implement erasure coding to protect (e.g. re-protect) replicated chunk data efficiently while reducing the storage capacity overhead associated with replication. In this manner, erasure coding enhances data protection scalability in large distributed storage systems, such as cloud-based storage systems, that comprise a plurality of nodes (or zones/clusters).

By way of explanation, as will be described in detail with reference to FIGS. 2-3, erasure coding encodes data that has been divided into k data fragments of equal size to create m redundant coding fragments. The encoding assures that the loss of any up to any m fragments of the k+m fragments can be tolerated. To recover lost fragments erasure coding decodes the available data fragments and coding fragments.

As further described herein, the system may update coding fragments to ensure re-protection is maintained in response to the removal of data. Traditionally, when erasure coding is implemented, re-protection is maintained by performing an entire or complete re-encoding process. For example, during such a re-encoding process, the system may pad or use placeholder data (e.g. fill data with zeroes) or use another data complement to maintain the fixed size of data chunks. Accordingly, such a re-encoding process may provide additional processing overhead. For example, in a traditional approach, the system must 1) read all available data fragments (which includes data from remote nodes); 2) manipulate entire chunks of data (e.g. 128 MB) of actual and placeholder data; and 3) perform a complete set of math operations to produce new coding fragments.

To alleviate the potential inefficiencies encountered in such a traditional approach, the embodiments described herein provide a more efficient mechanism by performing a more efficient re-encoding process (or "un-encoding"). The un-encoding process uses the data to be removed to "un-encode" coding fragments when performing an update, while traditional approaches use the remaining data (which involves more processing) when updating coding fragments. Accordingly, the re-encoding process of the embodiments of the disclosure may provide a reduction of consumed resources during data re-protection.

FIG. 1 illustrates an overview of an operating environment of a distributed data storage system according to one embodiment of the disclosure.

As shown, distributed data storage system 100 includes one or more storage nodes (105A-C, 105 generally), which may include (or connect to) one or more storage units (115A/B, 115 generally). In one embodiment, a node 105 may be a logical unit that may include one or more storage units 115. Storage units 115 may be any suitable storage device for storing data. For example, the storage units 115 may include magnetic disks, solid state disks, optical disks such as CD-ROM or DVD based storage, magnetic tape storage, magneto-optical (MO) storage media, flash memory based devices, or any other type of non-volatile storage devices suitable for storing large volumes of data. Storage units 115 may also be combinations of such devices. In the case of disk storage media, storage units 115 may be organized into one or more volumes of Redundant Array of Inexpensive Disks (RAID).

In one embodiment, storage engine 110 may be executed on one or more nodes 105. In one embodiment, storage engine 110 enables applications 107A, 109A, 107B, 109B, 107C, 109C to execute data I/O requests to and from distributed data storage system 100. In various embodiments, a distributed data storage system may include one or more clusters of nodes 105 that may be located in one or more locations. In one embodiment, the distributed data storage system 100 may be part of a cloud-based data storage system. In one embodiment, the distributed data storage system may partition disk space (e.g. storage space) into a set of blocks of fixed size called chunks.

Figure 2:
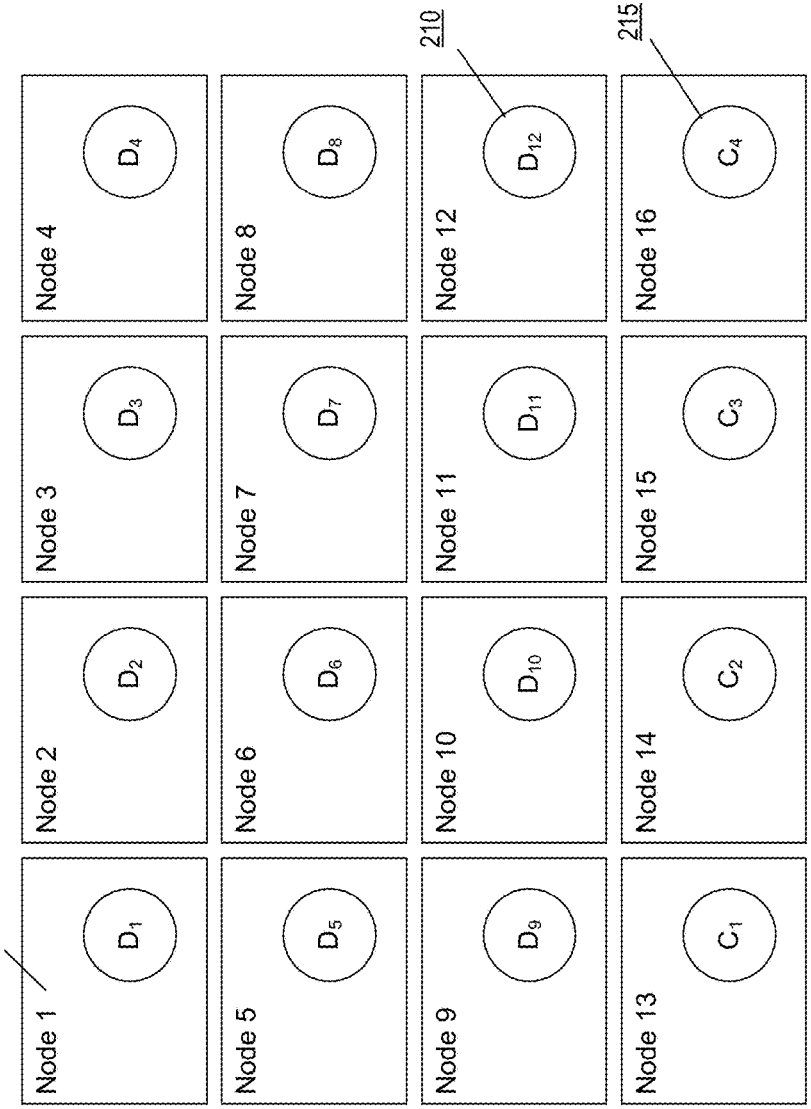
FIG. 2 is a diagram illustrating a layout of fragments for an example erasure coding in a data storage system according to one embodiment of the disclosure.

FIG. 2 is a diagram 200 illustrating an example implementation of erasure coding in a data storage system according to one embodiment of the disclosure. A data block (D) 210 to be protected may be divided into k fragments. During encoding m redundant coding fragments (C) 215 may be created. Therefore, a total of k+m fragments may be stored. In one embodiment, the method of erasure coding ensures that the system can tolerate the loss of any m fragments in the k+m fragments stored. In other words, the missing or corrupt fragments can be recovered based on the remaining fragments as long as no more than m fragments are invalid. In one embodiment, the coding scheme may be 12+4 (i.e. k equals to 12 and m equals to 4). As shown in this example, there are 16 nodes 220 (e.g. Node 1, Node 2 . . . Node 16) and 16 fragments (D1, D2 . . . D12, C1, C2, C3, and C4) to be stored. In one embodiment, each node may store only one fragment. In other embodiments (not shown), one node may store multiple fragments. As described, when some fragments are missing, the missing fragments may be restored via a decoding operation. In embodiments described herein, the data protection mechanism may implement various variants of a matrix-based erasure coding. FIG. 3 shows one such variant.

Figure 3:
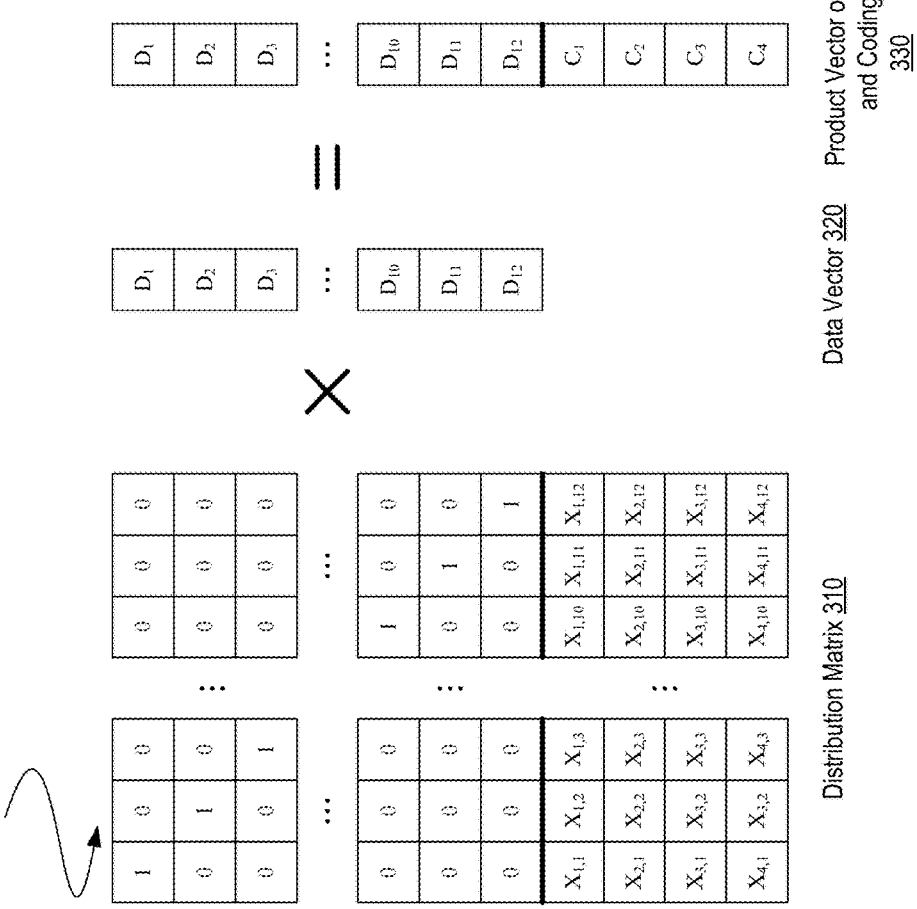
FIG. 3 is a block diagram illustrating an example of a matrix-based erasure coding used in conjunction with one or more embodiments of a data storage system as described herein.

FIG. 3 is a block diagram illustrating an example of a matrix-based erasure coding 300 for k+m=12+4 fragments, and used in providing a data protection system according to one embodiment of the disclosure. The example shown in FIG. 3 implements a Reed-Solomon erasure coding, but other implementations are also contemplated.

As shown in this example, the k+m data and coding fragments (12+4) are a matrix-vector product, where the vector comprises k (12) data fragments and the matrix is a distribution matrix of (k+m)×k size. The first k rows of the distribution matrix compile a k×k identity matrix. The bottom m rows of the distributed matrix form the coding matrix. Coefficients $X_{i,j}$ may be defined in a various ways depending on the erasure coding technique implemented.

For example, as shown, during encoding, the distribution matrix 310 may be multiplied by a data vector 320 to produce a product vector 330 containing both the data and the coding fragments. When one or more fragments are lost (e.g. corrupted), the system may restore the fragments using a corresponding decoding matrix.

As described above, in some embodiments, the storage space used by the system may be partitioned into a set of blocks of a fixed size called chunks. For example, the chunk size may be 128, 256, or 512 Megabytes (MBs), although other chunk sizes are also contemplated. In some embodiments, all user data may be stored in these chunks and the chunks may be shared. For example, one chunk may contain fragments of several user data objects.

Figure 4:
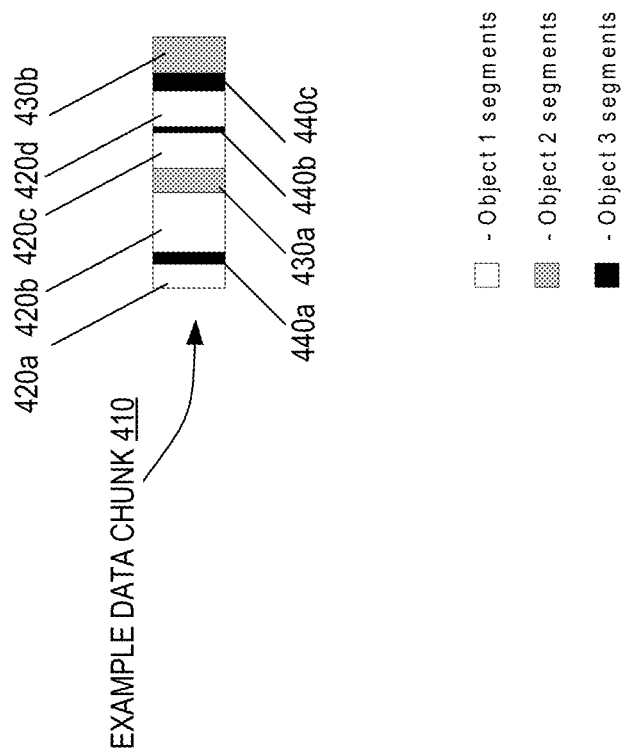
FIG. 4 is a block diagram illustrating an example of a data chunk used in conjunction with one or more embodiments of a data storage system as described herein.

FIG. 4 is a block diagram illustrating an example of a data chunk that may be used in conjunction with one or more embodiments of a data storage system as described herein.

In one embodiment, a chunk 410 may contain mixed segments of several user data objects. As shown, chunk 410 may contain segments 420a, 420b, 420c, 420d that belong to Object 1, segments 430a, 430b that belong to Object 2, and segments 440a, 440b, 440c that belong to Object 3. A user data object may be stored as a set of segments that reside in several chunks. In addition, chunk content may be modified in append-only mode, and when a chunk becomes full, the chunk may be sealed (e.g. content of sealed chunks are immutable). As described herein, data chunks may be protected with erasure coding.

As described, embodiments may provide a mechanism to provide a data re-protection mechanism. These mechanisms may require the updating of data in response to various events. For example, a situation that may precipitate a requirement to re-protect data may include performing various Garbage Collection (GC) processes. For example, a system may utilize a plain GC process, which reclaims capacity of chunks that become empty. The system may also utilize a copying, de facto generational, GC process, which copies content of underloaded chunks to new chunks and then reclaims capacity of old chunks. In addition, the system may utilize a Quasi-Compacting GC (QCGC) process, which identifies unused blocks within chunks, reclaims their capacity, and then re-uses the free blocks obtained to create new composite chunks. Systems may achieve an efficient tradeoff between capacity reclamation speed and complexity/overhead when QCGC is implemented at the data fragment level. In some implementations, QCGC may be aggressive so it may be rare for a chunk to end its life in one piece. Accordingly, most chunks may lose one or two data fragments during their lifetime. For example, if there are a certain number of data fragments with no live data, such a chunk may be subject for copying GC. Accordingly, content of a chunk may require re-protection after the chunk loses one or more of its data fragments.

As described above, some of the traditional approaches merely re-encode chunks with the remaining data including missing data fragments replaced with placeholder data (e.g. filled with zeroes). As a more efficient technique, embodiments herein use the fragment to be removed when performing a re-encoding. Such a mechanism may be initially described in relation to an analogy when an XOR technique is used for data re-protection. For example, the task of re-protection has a simplified solution when XOR (eXclusive OR) technique is used. For instance, suppose four data fragments need to be protected using XOR, then a parity fragment (P) can be calculated using the following formula:

$$P = D_1 \oplus D_2 \oplus D_3 \oplus D_4$$

Where $D_i$ are the data fragments.

Now suppose, for example, a data fragment $D_3$ needs to be removed from the set of data fragments. As a result, the parity fragment needs to be updated. For example, the remaining data fragments may be re-protected using un-XOR operation using the following formula:

$$P' = P \oplus D_3$$

A parity fragment P is a combined fragment. Thus, in order to obtain an updated parity fragment (P' above), the system needs to remove the part of the original parity fragment that previously corresponded to the data fragment to be removed. As the formula above shows, when an XOR technique is used, an un-XOR operation is performed using the XOR operation. Accordingly, the operation needs to be repeated N times, where N is the number of data fragments to be removed.

In a similar manner as described above, an efficient re-protection mechanism may be achieved for systems implementing erasure coding by performing a similar set of operations. For example, the matrix-based encoding operation shown in FIG. 3 above may be represented with the following formula:

$$C_i = \sum_{j=1}^{k} X_{i,j} * D_j$$

Thus, if some data fragment $D_l$ needs to be removed, the remaining data fragments can be re-protected by updating of all of the coding fragments (C). Accordingly, the coding fragments may be updated using the following formula:

$$C'_i = C_i - X_{i,l} * D_l$$

Thus, if there are N data fragments to be removed, the following formula may be used:

$$C'_i = C_i - \sum_{j \in R} X_{i,j} * D_j$$

Where R represents the set of indices of data fragments to be removed. The efficient re-encoding method described above and implemented by embodiments described herein may also be referred to as an un-encoding technique.

Figure 5:
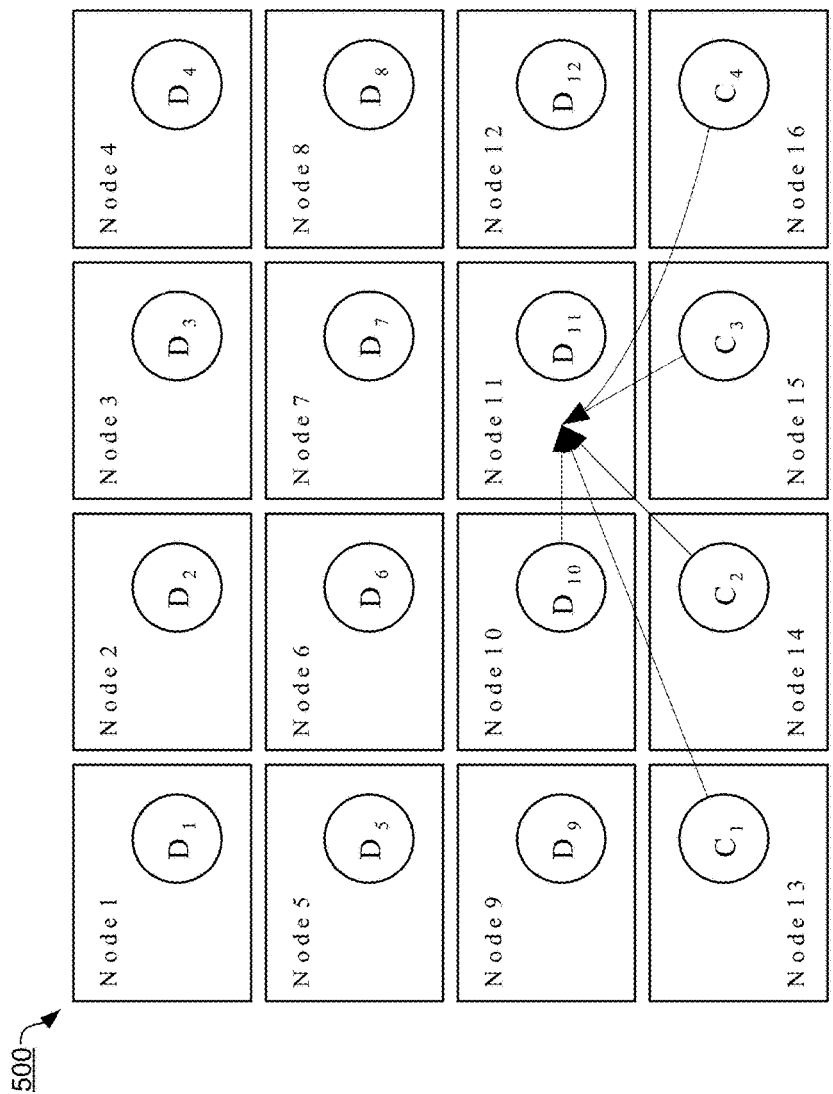
FIG. 5 is a diagram illustrating accessing fragments for an example layout for an erasure coding in a data storage system according to one embodiment of the disclosure.
Figure 6:
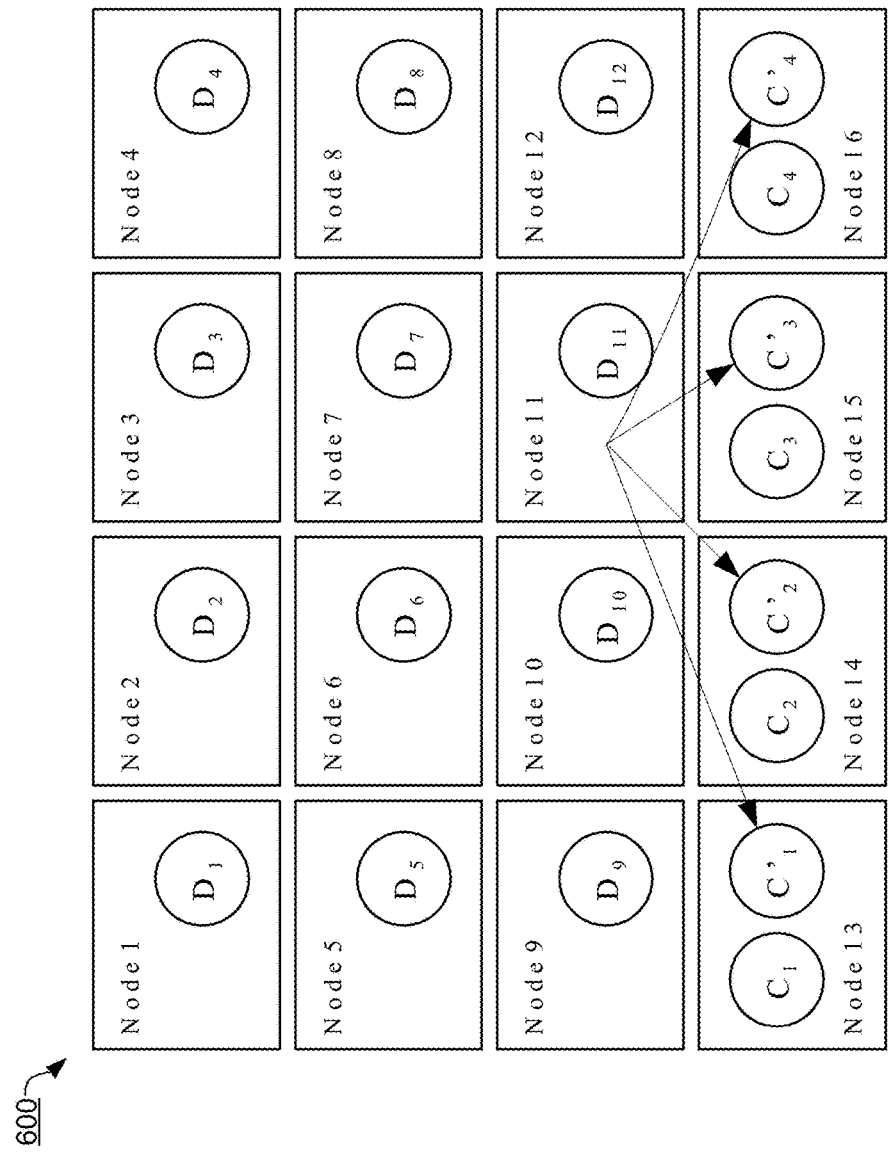
FIG. 6 is a diagram illustrating updating coding fragments for an example layout of an erasure coding in a data storage system according to one embodiment of the disclosure.
Figure 7:
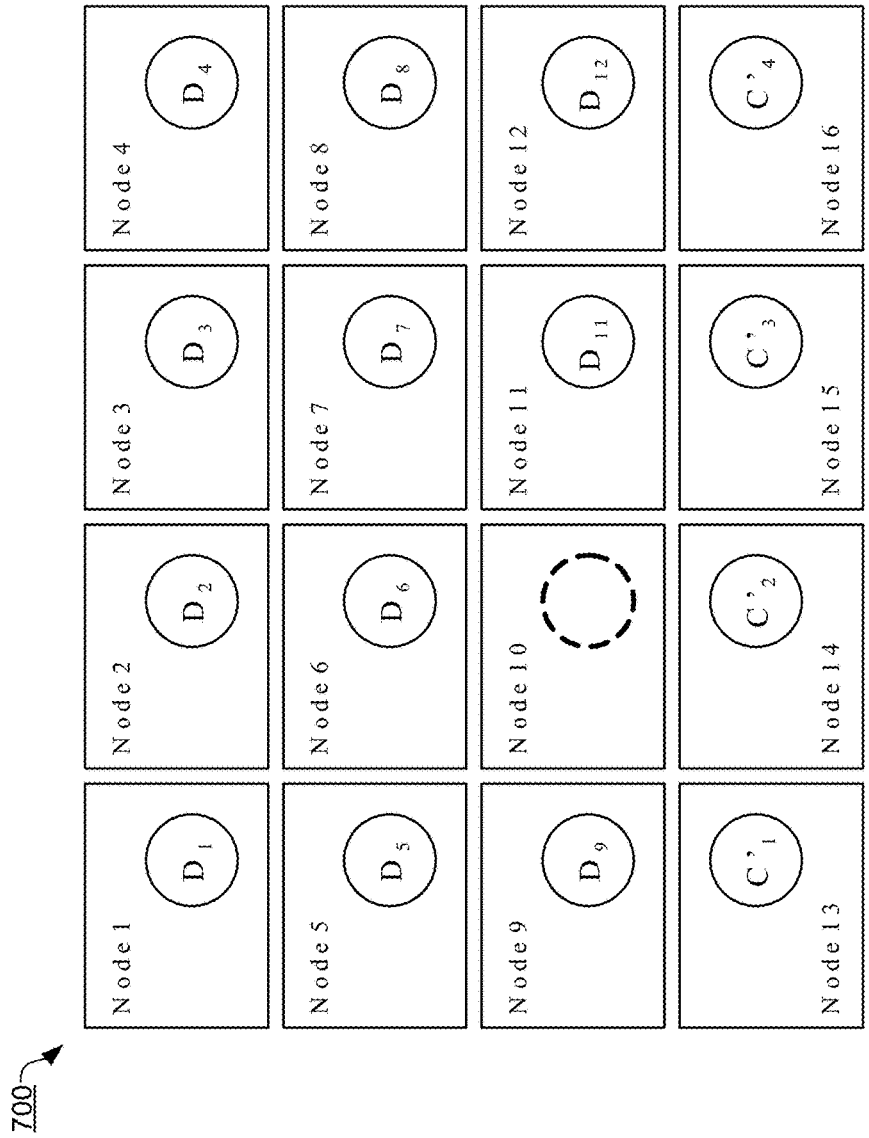
FIG. 7 is a diagram illustrating an example layout of fragments after a re-encoding in a data storage system according to one embodiment of the disclosure.

FIGS. 5-7 provide an example of a performing the efficient re-encoding (e.g. un-encoding) by one or more of the embodiments described herein. For instance, suppose the system has a layout of data and coding fragments as shown in the example of FIG. 2, and data fragment $D_{10}$ needs to be removed. The remaining data fragments may be re-protected using an efficient re-encoding (or un-encoding) method as follows:

Step 1: Some node, Node 11 in this example, is allocated for the re-protection. Accordingly, the system may read the data and coding fragments required from the nodes (which may be remote) as shown in diagram 500 of FIG. 5. When the efficient re-encoding (e.g. un-encoding) method is implemented, only 5 fragments are required: data fragment $D_{10}$ and coding fragments $C_1$-$C_4$. In contrast, when traditional re-encoding is implemented as described above, the system requires 11 data fragments (all except $D_{10}$).

Step 2: The system (or Node 11 itself) may update the coding fragments using the formulas below. For example, the system (or node) may only need to perform 4 multiplications and 4 subtractions.

$$C'_1 = C_1 - X_{1,10} * D_{10}$$

$$C'_2 = C_2 - X_{2,10} * D_{10}$$

$$C'_3 = C_3 - X_{3,10} * D_{10}$$

$$C'_4 = C_4 - X_{4,10} * D_{10}$$

In contrast, with traditional re-encoding, the system (or Node 11) would need to perform 48 multiplications and 48 additions with 11 actual data fragments and 1 placeholder (or padded) data fragment.

Step 3: The system (or Node 11) may store the 4 updated coding fragments to remote nodes (e.g. Nodes 13-16) as shown in FIG. 6. In one embodiment, a particular node (e.g. Node 11) may initially store the 4 updated coding fragments.

Step 4: The system may remove the previous (or old) coding fragments and data fragment $D_{10}$. Accordingly, the system may reclaim the capacity of the removed data fragment as shown in FIG. 7.

Accordingly, as shown in the above example, embodiments of the disclosure provide a more efficient technique in that the system may read (or access) fewer fragments from remote nodes (5 vs the 11 required in traditional implementations); manipulates less data (9 data and coding fragments vs the 16 required in traditional implementations); and performs fewer operations (or calculations) to produce new coding fragments (8 vs the 96 required in traditional implementations).

Figure 8:
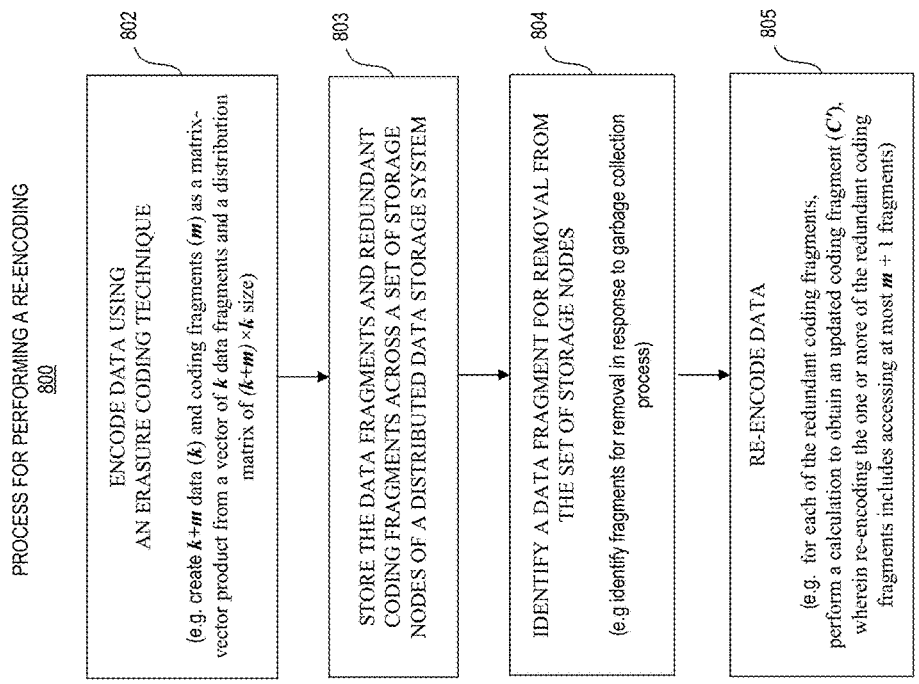
FIG. 8 is an example flow diagram of a process for performing data re-protection according to one embodiment of the disclosure.

FIG. 8 is an example flow diagram illustrating a method of performing data re-protection according to an embodiment of the disclosure. Process 800 may use processing logic, which may include software, hardware, or a combination thereof. For example, process 800 may be performed by one or more components of system (e.g. system 100, storage engine 110, one or more nodes 105, etc.).

In 802, the process may include encoding data using an erasure coding technique. In one embodiment, the encoding may include dividing the data into k data fragments (D), and creating, from the data fragments, m redundant coding fragments (C) using a coding matrix, wherein the redundant coding fragments allow for recovery of one or more of the data fragments.

In one embodiment, creating m redundant coding fragments may include creating a matrix-vector product from a vector including the k data fragments and a distribution matrix of (k+m)×k size, wherein the first k rows of the distribution matrix compile a k×k identity matrix and the bottom m rows of the distribution matrix form the coding matrix.

In 803, the process may include storing the data fragments and redundant coding fragments across a set of storage nodes of a distributed data storage system.

In 804, the process may include identifying a data fragment for removal from the set of storage nodes. For example, the removal may be performed in response to a garbage collection process. In one embodiment, the process may include reclaiming a storage capacity of the identified data fragment by performing the removal the data fragment from the distributed data storage system In 805, the process may include performing a re-encoding to reflect the removal of the identified data fragment. In one embodiment, the re-encoding may include for each of the redundant coding fragments, performing a calculation to obtain an updated coding fragment (C'). For example, the calculation may be based on an operation performed using at least a portion of the coding matrix and the identified data fragment.

In one embodiment, re-encoding one or more of the redundant coding fragments may include accessing at most m+1 fragments, wherein m is the number of coding fragments used for encoding the data. In addition, in one embodiment, for each of the redundant coding fragments, the calculation to obtain the updated coding fragment may be based on an operation performed using a coefficient (X) of the coding matrix and the identified data fragment, wherein the coefficient corresponds to the identified data fragment to be removed.

In one embodiment, as described above, the calculation to obtain the updated coding fragment may include a formula comprising: $C'_i = C_i - X_{i,j} * D_j$, wherein $X_{i,j}$ is a coefficient of the coding matrix, $C_i$ is an index of the redundant coding fragment to be updated, and $D_j$ is an index of the identified data fragment to be removed.

It should be noted that there may be variations to the flow diagrams or operations (or steps) described therein without departing from the embodiments described herein. For example, the operations may be performed in parallel, simultaneously, a differing order, or operations may be added, deleted, or modified.

Figure 9:
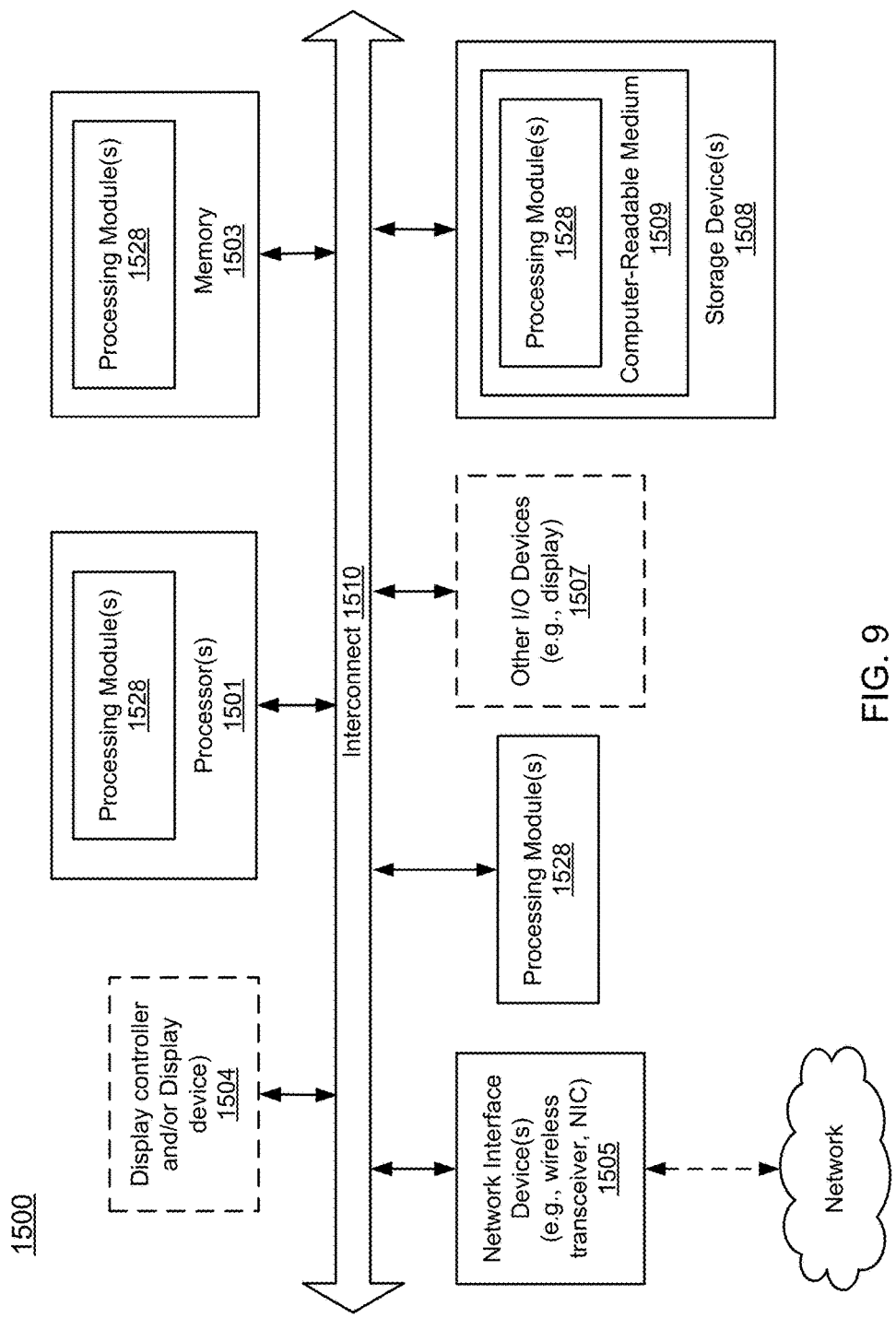
FIG. 9 is a block diagram illustrating an example computing system that may be used in conjunction with one or more embodiments of the disclosure.

FIG. 9 is a block diagram illustrating an example computing system that may be used in conjunction with one or more embodiments of the disclosure.

For example, system 1500 may represent any of data processing systems described above performing any of the processes or methods described above, such as, for example, one or more components shown in configuration 100 (e.g. system 100, storage engine 110, nodes 105, storage unit 115, etc.). System 1500 can include many different components. In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501 may be configured to execute instructions for performing the methods, processes, operations, functions, etc. as discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a Wi-Fi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

IO devices 1507 may include various electronic displays (e.g., a monitor having a screen, a small LCD touch-screen or any other electrical device that is operable to display information), audio output (such as speakers).

Storage device 1508 may include computer-readable storage medium 1509 (or machine-readable storage medium, computer-accessible medium, etc.) on which is stored one or more sets of instructions or software (e.g. processing modules 1528) embodying any one or more of the methods, processes, operations, functions, etc. as described herein. In addition, the computer-readable storage medium 1509 may also include removable or portable media (e.g. magnetic disk storage media, optical storage media, USB media, CD-ROM, flash memory devices, etc.).

Processing modules 1528 (or component/unit/logic) may represent any of the components of configuration 100 (e.g. storage engine 110, applications 107-109, nodes 105) etc.). Processing modules 1528 may also reside, completely or at least partially, within memory 1503 and/or within processor 1501 during execution thereof by system 1500, memory 1503, and processor 150, which may also constitute a computer-readable storage medium. In addition, processing modules 1528 can be implemented as firmware or functional circuitry within hardware devices. Further, processing modules 1528 can be implemented in any combination hardware devices and software components.

Note that while system 1500 is illustrated with various components of a data processing system, it is not intended to represent any particular architecture or manner of interconnecting the components; as such details are not germane to embodiments of the present disclosure. It will also be appreciated that network computers, handheld computers, mobile phones, servers, and/or other data processing systems which have fewer components or perhaps more components may also be used with embodiments of the disclosure.

The processes or methods depicted in the preceding figures may be performed by processing logic that comprises hardware (e.g. circuitry, dedicated logic, etc.), firmware, software (e.g., embodied on a non-transitory computer-readable storage media), or a combination of both. Although the processes or methods are described above in terms of some sequential operations, it should be appreciated that some of the operations described may be performed in a different order. Moreover, some operations may be performed in parallel rather than sequentially.

In the foregoing specification, example embodiments of the disclosure have been described. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method to provide data re-protection, comprising:
   encoding data using an erasure coding technique, wherein the encoding includes dividing the data into k data fragments (D), and
      creating, from the data fragments, m redundant coding fragments (C) using a coding matrix, wherein the redundant coding fragments allow for recovery of one or more of the data fragments;
   storing the data fragments and redundant coding fragments across a set of storage nodes of a distributed data storage system;
   identifying a data fragment for removal from the set of storage nodes; and
   performing a re-encoding to reflect the removal of the identified data fragment, wherein the re-encoding includes for each of the redundant coding fragments,
   performing a calculation to obtain an updated coding fragment (C'), wherein the calculation is based on an operation performed using at least a portion of the coding matrix and the identified data fragment.

2. The method of claim 1, wherein re-encoding the one or more of the redundant coding fragments includes accessing at most m+1 fragments, wherein m is the number of coding fragments used for encoding the data.

3. The method of claim 1, wherein for each of the redundant coding fragments, the calculation to obtain the updated coding fragment is based on an operation performed using a coefficient (X) of the coding matrix and the identified data fragment, wherein the coefficient corresponds to the identified data fragment to be removed.

4. The method of claim 1, wherein for each of the redundant coding fragments, the calculation to obtain the updated coding fragment is a formula comprising:
   $C'_i = C_i - X_{i,j} * D_j$, wherein $X_{i,j}$ is a coefficient of the coding matrix, $C_i$ is an index of the redundant coding fragment to be updated, and $D_j$ is an index of the identified data fragment to be removed.

5. The method of claim 1, creating m redundant coding fragments includes creating a matrix-vector product from a vector including the k data fragments and a distribution matrix of (k+m)×k size, wherein the first k rows of the distribution matrix compile a k×k identity matrix and the bottom m rows of the distribution matrix form the coding matrix.

6. The method of claim 1, further comprising reclaiming a storage capacity of the identified data fragment by performing the removal the data fragment from the distributed data storage system.

7. The method of claim 1, wherein the data fragment to be removed is identified based on a garbage collection process.

8. A data storage system, comprising:
   a memory storing instructions; and
   one or more processors coupled to the memory to execute the instructions from the memory, the one or more processors being configured to perform operations, the operations comprising:
   encoding data using an erasure coding technique, wherein the encoding includes
      dividing the data into k data fragments (D), and
      creating, from the data fragments, m redundant coding fragments (C) using a coding matrix, wherein the redundant coding fragments allow for recovery of one or more of the data fragments;
   storing the data fragments and redundant coding fragments across a set of storage nodes of a distributed data storage system;
   identifying a data fragment for removal from the set of storage nodes; and
   performing a re-encoding to reflect the removal of the identified data fragment, wherein
      the re-encoding includes for each of the redundant coding fragments,
      performing a calculation to obtain an updated coding fragment (C'), wherein the calculation is based on an operation performed using at least a portion of the coding matrix and the identified data fragment.

9. The system of claim 8, wherein re-encoding the one or more of the redundant coding fragments includes accessing at most m+1 fragments, wherein m is the number of coding fragments used for encoding the data.

10. The system of claim 8, wherein for each of the redundant coding fragments, the calculation to obtain the updated coding fragment is based on an operation performed using a coefficient (X) of the coding matrix and the identified data fragment, wherein the coefficient corresponds to the identified data fragment to be removed.

11. The system of claim 8, wherein for each of the redundant coding fragments, the calculation to obtain the updated coding fragment is a formula comprising:
   $C'_i = C_i - X_{i,j} * D_j$, wherein $X_{i,j}$ is a coefficient of the coding matrix, $C_i$ is an index of the redundant coding fragment to be updated, and $D_j$ is an index of the identified data fragment to be removed.

12. The system of claim 8, creating m redundant coding fragments includes creating a matrix-vector product from a vector including the k data fragments and a distribution matrix of (k+m)×k size, wherein the first k rows of the distribution matrix compile a k×k identity matrix and the bottom m rows of the distribution matrix form the coding matrix.

13. The system of claim 8, further comprising reclaiming a storage capacity of the identified data fragment by performing the removal the data fragment from the distributed data storage system.

14. The method of claim 1, wherein the data fragment to be removed is identified based on a garbage collection process.

15. A non-transitory computer-readable storage medium having instructions stored therein, which when executed by a processor, cause the processor to perform operations in a data storage system, the operations comprising:
   encoding data using an erasure coding technique, wherein the encoding includes
      dividing the data into k data fragments (D), and
      creating, from the data fragments, m redundant coding fragments (C) using a coding matrix, wherein the redundant coding fragments allow for recovery of one or more of the data fragments;

storing the data fragments and redundant coding fragments across a set of storage nodes of a distributed data storage system;

identifying a data fragment for removal from the set of storage nodes; and performing a re-encoding to reflect the removal of the identified data fragment, wherein the re-encoding includes for each of the redundant coding fragments, performing a calculation to obtain an updated coding fragment (C'), wherein the calculation is based on an operation performed using at least a portion of the coding matrix and the identified data fragment.

16. The medium of claim 15, wherein re-encoding the one or more of the redundant coding fragments includes accessing at most m+1 fragments, wherein m is the number of coding fragments used for encoding the data.

17. The medium of claim 15, wherein for each of the redundant coding fragments, the calculation to obtain the updated coding fragment is based on an operation performed using a coefficient (X) of the coding matrix and the identified data fragment, wherein the coefficient corresponds to the identified data fragment to be removed.

18. The medium of claim 15, wherein for each of the redundant coding fragments, the calculation to obtain the updated coding fragment is a formula comprising:

$C'_i = C_i - X_{i,j} * D_j$, wherein $X_{i,j}$ is a coefficient of the coding matrix, $C_i$ is an index of the redundant coding fragment to be updated, and $D_j$ is an index of the identified data fragment to be removed.

19. The medium of claim 15, creating m redundant coding fragments includes creating a matrix-vector product from a vector including the k data fragments and a distribution matrix of (k+m)×k size, wherein the first k rows of the distribution matrix compile a k×k identity matrix and the bottom m rows of the distribution matrix form the coding matrix.

20. The medium of claim 15, further comprising reclaiming a storage capacity of the identified data fragment by performing the removal the data fragment from the distributed data storage system.

* * * * *